Dec. 2, 1969     S. M. BAKLOR     3,482,012

METHOD FOR FORMING SLENDER ARTICLE JACKET

Original Filed Feb. 6, 1967

*INVENTOR*
SANFORD M. BAKLOR

BY *Albert J. Kramer*

ATTORNEY 3,482,012
METHOD FOR FORMING SLENDER
ARTICLE JACKET
Sanford M. Baklor, Baltimore, Md., assignor to Maryland Cup Corporation, Owings Mills, Md., a corporation of Maryland
Original application Feb. 6, 1967, Ser. No. 614,106, now Patent No. 3,366,266. Divided and this application Dec. 4, 1967, Ser. No. 687,624
Int. Cl. B29d 23/08; B29c 17/02
U.S. Cl. 264—296             3 Claims

ABSTRACT OF THE DISCLOSURE

A method of forming jackets for slender articles is provided by first forming a seamless cylindrical tube, open at both ends, of a resilient plastic material and then pressing the ends of the tube together under heat and pressure to form resilient closure lips.

---

This application is a division of my copending application for Patent Ser. No. 614,106, filed Feb. 6, 1967 now Patent No. 3,366,266.

This invention relates to jackets and it is more particularly concerned with a method of forming a jacket for retaining slender objects under sanitary conditions.

Devices such as thermometers are frequently used in hospitals. They are transported from a central sterilization point to various places in the hospital where they are to be used, particularly at the bedsides of patients.

It is an object of the present invention to provide a tubular jacket into which a thermometer or other slender implement can be readily disposed in clean condition and carried about from place to place while retaining its clean condition until it is to be used and which can then be readily removed from the tubular member.

Another object of the invention is the provision of a method of forming such a tubular member which is closed at both ends but which can be resiliently opened by the application of simple pressure of the fingers whereby a thermometer or other slender article therein can be readily removed.

A further object is the provision of such a method which is rapid, efficient and effective.

Still further objects, advantages and features of the invention will appear more fully from the following description considered together with the accompanying drawing.

Figure 1:
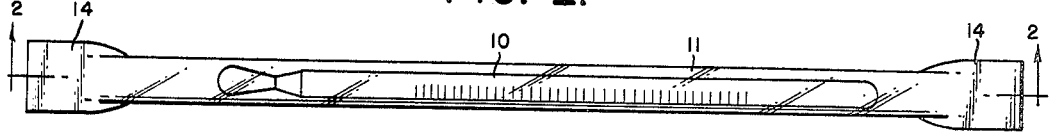
FIG. 1 is an elevational view of an embodiment of the invention.
Figure 2:
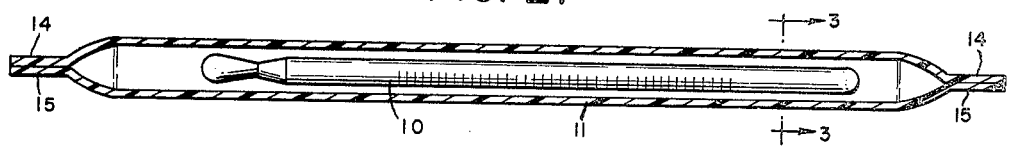
FIG. 2 is a longitudinal sectional view along the line 2—2 of FIG. 1.
Figure 3:
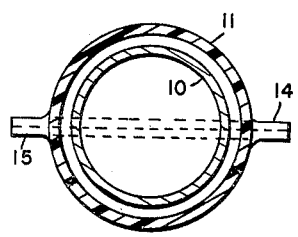
FIG. 3 is a cross-sectional view along the line 3—3 of FIG. 1.

Referring with more particularity to the drawing in which like numerals designate like parts, the invention is adapted to the production of a device illustrated in FIGS. 1 to 3, which device comprises a seamless tubular section 11 of resilient plastic material, such as of polypropylene, the ends of which are flattened to provide closure lips 14 and 15 held together by the resiliency of the plastic material.

The device has many useful purposes as a jacket for holding slender articles, such as thermometers 10, probes, and the like.

Figure 4:
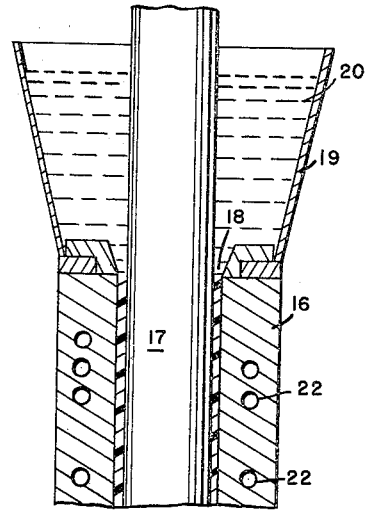
FIG. 4 is a schematic sectional view illustrating a conventional means for forming plastic tubing comprising and illustrating the first step of the method of the invention.
Figure 5:
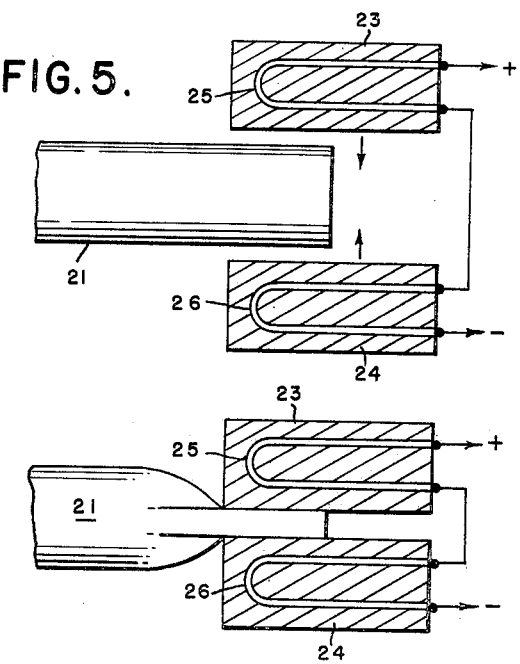
FIGS. 5 and 6 are schematic sectional views of subsequent steps in the method of the invention.
Figure 6:
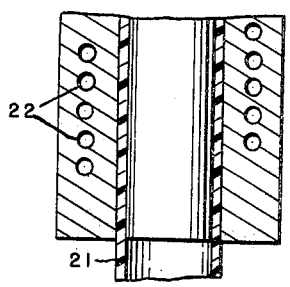

As a first step in manufacturing the article according to this invention, a plastic tube is first formed by any conventional means, such as that illustrated in FIG. 4. Such means consists of an outer die part 16 and an inner die part 17 in spaced relation forming an annular passageway 18 therebetween. A hopper 19 is integral with the outer die part 16 for holding a mass of hot liquid plastic material 20 of which the tube is to be made. The material flows through the annular passages forming a tube 21 which is quickly cooled by cooling means 22 associated with the dies.

The formation is continuous and after cooling it is cut into separate pieces of desired lengths.

The next step in the process is to insert the ends of the tubes thus formed between press members 23 and 24. These press members are provided with heating elements 25 and 26 to elevate the temperature to where the plastic can be reshaped. In the case of polypropylene, for example, a temperature in the range of about 200° to 300° F. is needed.

After pressing, the ends are promptly removed and cooled whereupon they retain their pressed condition.

The use of the resulting article is fuly described in U.S. Patent No. 3,366,266, which is incorporated herein by reference.

I claim:
1. The method of forming a slender article jacket consisting of forming a seamless cylindrical tube open at both ends of a resilient plastic material and then pressing the outermost ends of the tube together under heat and pressure to form resiliently openable closure lips without cohesion at both ends followed by prompt removal of the ends from the pressing means and cooling to retain the pressed condition with cohesion.
2. The method as defined by claim 1 in which the resilient plastic material is polypropylene.
3. The method as defined by claim 2 in which the pressing of the ends of the tube is effected by heat in the range of about 200° to 300° F.

References Cited

UNITED STATES PATENTS

| | | | |
|---|---|---|---|
| 2,136,007 | 11/1938 | Gish | 222—92 |
| 2,188,191 | 1/1940 | Ross | 222—490 |
| 3,271,490 | 9/1966 | Cattaneo | 264—92 |
| 2,430,995 | 11/1947 | Roos | 222—107 |
| 2,575,138 | 11/1951 | Slaughter | 18—13 |
| 2,715,087 | 8/1955 | Barradas | 154—83 |
| 3,309,837 | 3/1967 | Faust | 53—39 |

ROBERT F. WHITE, Primary Examiner

RICHARD R. KUCIA, Assistant Examiner

U.S. Cl. X.R.

264—294

UNITED STATES PATENT OFFICE
CERTIFICATE OF CORRECTION

Patent No. 3,482,012                                 December 2, 1969

Sanford M. Baklor

It is certified that error appears in the above identified patent and that said Letters Patent are hereby corrected as shown below:

Column 2, line 43, "pressed condition with cohesion." should read -- pressed condition. --.

Signed and sealed this 2nd day of June 1970.

(SEAL)
Attest:

Edward M. Fletcher, Jr.

Attesting Officer

WILLIAM E. SCHUYLER, JR.

Commissioner of Patents